Figure 1:
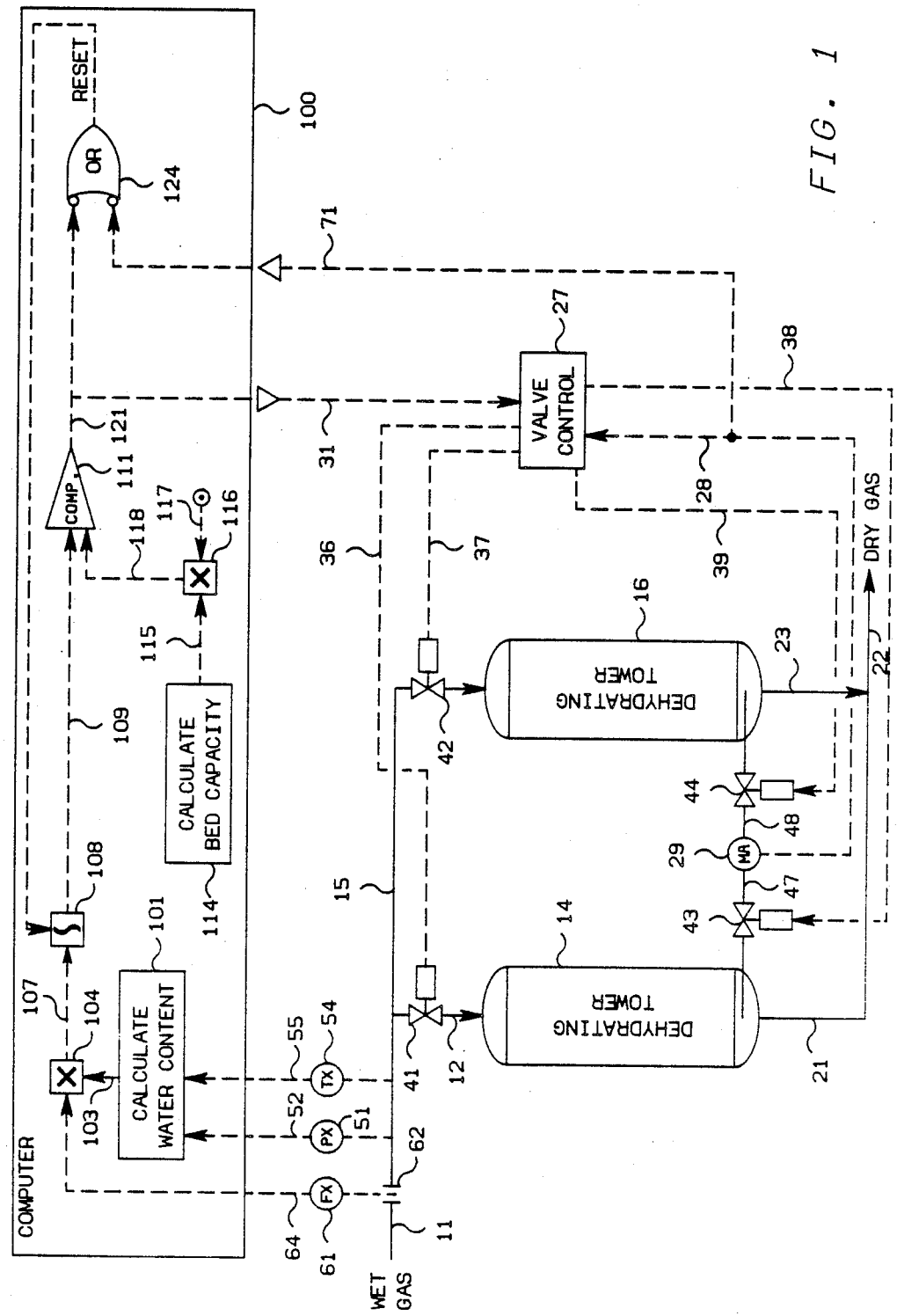

United States Patent [19]

Carlisle et al.

[11] Patent Number: 4,504,286

[45] Date of Patent: Mar. 12, 1985

[54] AUTOMATIC DRYING TOWER SWITCHING SYSTEM

[75] Inventors: Thomas A. Carlisle; Phillip R. Smith, both of Bartlesville, Okla.; Frank H. Thorn, deceased, late of Bartlesville, Okla., by Carl L. Thorn, Ernest F. Thorn, Alexandra L. Thorn, heirs

[73] Assignee: Phillips Petroleum Company, Bartlesville, Okla.

[21] Appl. No.: 603,857

[22] Filed: Apr. 25, 1984

[51] Int. Cl.$^3$ .............................................. B01D 53/04
[52] U.S. Cl. ............................................ 55/20; 55/21; 55/32; 55/163; 364/172; 364/502
[58] Field of Search .................... 55/20, 21, 32, 163, 55/179; 73/29; 364/172, 173, 500, 502

[56] References Cited

U.S. PATENT DOCUMENTS 4,127,395  11/1978  McKey et al. .......................... 55/20

Primary Examiner—Charles Hart
Attorney, Agent, or Firm—Franch and Doescher

[57] ABSTRACT

In a process in which parallel dehydrating towers are utilized to remove water from a wet gas, the amount of water provided to a desicant bed contained in a drying tower during a drying cycle is determined and compared to the capacity of the desicant bed. This comparison is utilized to override control based on a moisture analyzer in such a manner that switching between the two dehydrating towers is accomplished even if the moisture analyzer fails.

10 Claims, 2 Drawing Figures

AUTOMATIC DRYING TOWER SWITCHING SYSTEM

This invention relates to the control of parallel drying (dehydrating) towers used to remove moisture from gases.

Drying or dehydrating towers are used in many applications to remove moisture from gases. Such drying towers are also referred to as desicant dryers and generally contain a solid desicant such as alumina or molecular sieve. A parallel configuration of the drying towers is utilized such that the desicant bed in one of the drying towers may be utilized to remove moisture from a gas while the desicant bed in the second drying tower is being regenerated. Regeneration is typically accomplished by heating and/or by evacuation and/or by passing a purge gas through the desicant bed.

Ideally, a desicant bed would be utilized to its full capacity before the flow of the wet gas is switched to a second drying tower. However, in many operations a large margin of error is maintained so as to insure that moisture will not break through the desicant bed. This results in inefficient operation.

The capacity of the desicant bed decreases during its useful life which requires decreasing the drying time to prevent moisture breakthrough. However, many times the cycle time for a desicant bed is chosen to reflect the anticipated bed capacity at the end of the useful life of the desicant and this cycle time is used from the beginning.

Ideally, switching of the drying towers should be controlled on a water breakthrough basis. This utilizes the full desicant bed capacity which reduces associated utility and replacement costs. The water breakthrough basis automatically accounts for varying inlet water content and varying capacity of the desicant beds.

Many attempts have been made to incorporate a moisture analyzer into a control scheme and to switch between the drying towers based on a water breakthrough signal from the moisture analyzer. However, while this approach is basically sound and solves the problems associated with switching based only on time, the moisture analyzers and their sampling systems have not generally proven reliable enough for field applications.

It is thus an object of this invention to provide method and apparatus for automatically switching the flow of wet gas between parallel drying towers which utilizes the ideal concept of control based on water breakthrough and also removes reliability problems which occur when control is based solely on a moisture analyzer.

In accordance with the present invention, method and apparatus is provided whereby the amount of water provided to a desicant bed during a drying cycle is determined and compared to the capacity of the desicant bed. This comparison is utilized to override control based on a moisture analyzer in such a manner that desicant bed switching is accomplished even if the moisture analyzer fails. The switching is thus based on water breakthrough using a moisture analyzer but provision is made for overriding the moisture analyzer which improves reliability.

Figure 2:
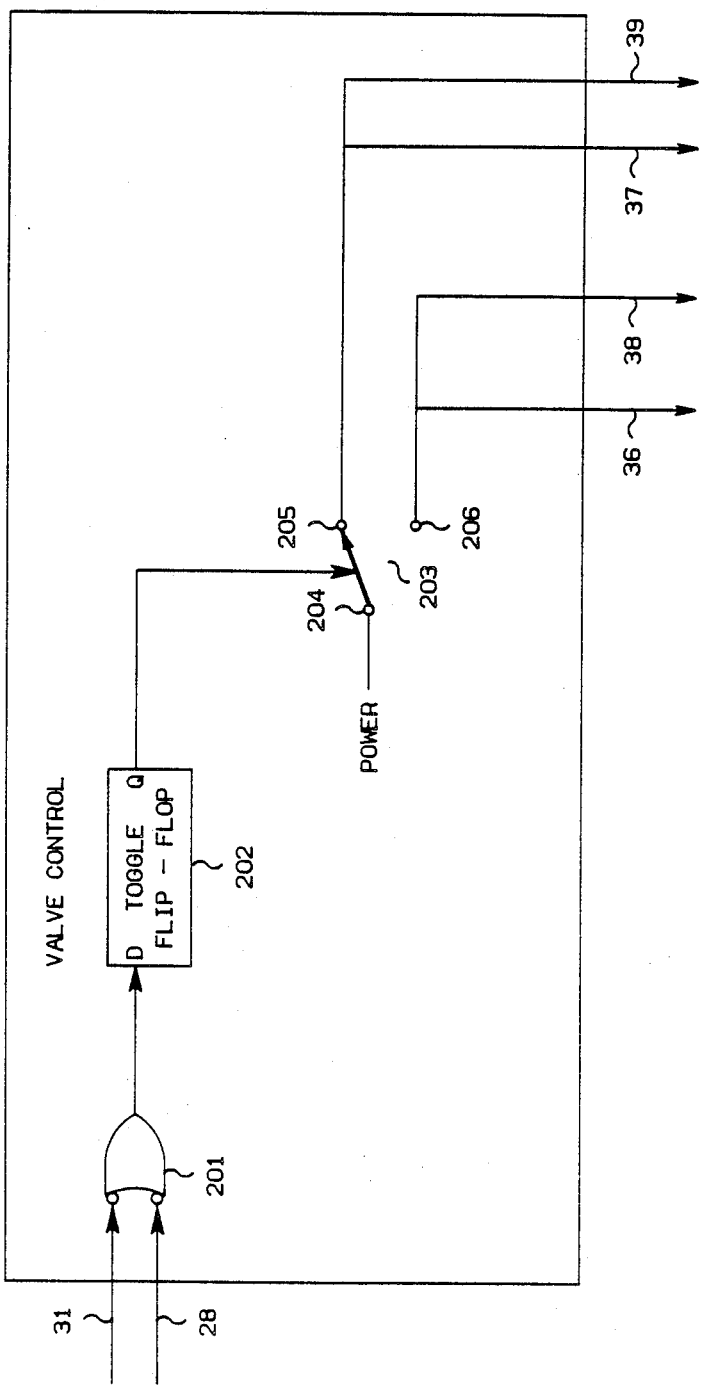

Other objects and advantages of the invention will be apparent from the foregoing brief description of the invention and the claims as well as the detailed description of the drawings which are briefly described as follows:

FIG. 1 is an illustration of parallel drying towers and the associated control system of the present invention for switching operation between the two drying towers illustrated; and FIG. 2 is a schematic of the valve control illustrated in FIG. 1.

The invention is described in terms of drying natural gas. However, the invention is applicable to the drying of any wet gas using a parallel combination of drying towers.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably a Fischer and Porter Model 50KM (tradename Chameleon).

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, natural gas having an undesirably high moisture content is provided through the combination of conduit means 11 and 12 to the dehydrating tower 14 and through the combination of conduit means 11 and 15 to the dehydrating tower 16. The dehydrating towers 14 and 16 will generally contain a desicant bed made up of a material such as alumina or molecular sieve.

Dried natural gas is removed from the dehydrating tower through the combination of conduit means 21 and 22. In like manner, dried natural gas is removed from the dehydrating tower 16 through the combination of conduit means 23 and 22.

Two signals, which will be described more fully hereinafter, are provided to the valve control 27. Signal 28, which is provided from the moisture analyzer 29, is utilized to monitor for a moisture breakthrough. Signal 31, from computer 100, is utilized to override control based on signal 28 when calculations indicate that a water breakthrough has occurred and the moisture analyzer has failed. Signal 28 is also provided to computer 100 and is specifically provided as a first input to the OR gate (implemented in digital logic) 124.

Valve control 27 provides control signals 36–39 to valves 41–44, respectively, which are operably located in conduit means 12, 15, 47 and 48, respectively. When a drying cycle for the dehydrating tower 14 is completed, as indicated by a change in signal 28 or 31, the valve control 27 will operate to close valves 41 and 43 and open valves 42 and 44. In like manner, when a change in signals 28 and 31 indicate that the drying cycle is complete for the dehydrating tower 16, the valve control 27 will operate to close valves 42 and 44 and open valves 41 and 43. The manner in which this switching is accomplished will be described more fully hereinafter.

It is noted that the dehydrating tower which is not being utilized to dry the natural gas will be placed in a regenerating cycle. However, since regeneration plays no part in the present invention, for the sake of simplicity regeneration will not be described in detail. Also, other conventional equipment which would normally be associated with a drying process has not been illustrated.

As has been previously stated, signal 28 is provided from the moisture analyzer 29. Any suitable moisture analyzer can be utilized. A preferred moisture analyzer is the Panametrics 2000 Moisture Analyzer. The moisture analyzer 29 is in fluid communication with the dehydrating tower 14 through conduit means 47. In like manner, the moisture analyzer 29 is in fluid communication with the dehydrating tower 16 through conduit means 48. Valves 43 and 44 are utilized to insure that the moisture analyzer 29 is in fluid communication with only one dehydrating tower at any one time.

A sample of the dry gas flowing from the dehydrating tower 14 or 16 is provided to the moisture analyzer 29 through conduit means 47 and 48, respectively. Until water breakthrough occurs, signal 28 will essentially indicate that no water is present in the dry gas. However, when water breakthrough does occur, the magnitude of signal 28 will change very rapidly which will enable the valve control 27 to switch to the dehydrating tower which has been regenerated.

Essentially, signal 28 may be considered a digital signal. When no (or a low level of) moisture is sensed, signal 28 will have a low value or logic level. However, when a moisture breakthrough is sensed, signal 28 will very quickly assume a high value or logic level.

The pressure and temperature of the wet gas is utilized to calculate the water content of the wet gas (lbs of water/MM cubic feet of gas). Pressure transducer 51 in combination with a pressure sensing device, which is operably located in conduit means 11, provides an output signal 52 which is representative of the actual pressure of the wet gas flowing through conduit means 11. Signal 52 is provided from the pressure transducer 51 as an input to computer 100 and in particular is provided to the calculate water content block 101.

Temperature transducer 54 in combination with a temperature measuring device, which is operably located in conduit means 11, provides an output signal 55 which is representative of the actual temperature of the wet gas flowing through conduit means 11. Signal 55 is provided from the temperature transducer 54 as an input to computer 100 and in particular is provided to the calculate water content block 101.

The water content (WC) of the wet natural gas (lbs of water/MMSCF) is calculated in the calculate water content block 101 in accordance with Equation (1) which is valid for natural gases.

$$WC = \frac{(A)(B)}{58.53} \quad (1)$$

where $A = 5.4235 - 0.1377T + 0.1278T^2 - 0.0001187T^3 + 0.00000105T^4;$ $B = \frac{24821.3}{P} + 9.59324;$ T = the temperature of the wet natural gas flowing through conduit means 11 (signal 55); and
P = the pressure of the wet natural gas flowing through conduit means 11 (signal 52).

The accuracy of the water content determined in accordance with Equation (1) is ±10% over the following ranges:
Temperature: +3° F. to +145° F.
Pressure: 75 psig to 1800 psig
Molecular Weight: 10 to 30

It is also noted that the results of Equation (1) compare very favorably with water content graphs such as the graph entitled Water Vapor Content of Natural Gas at Saturation; McCarthy, E. I., Boyd, W. D. and Reid, L. S.; presented at A.I.M.E. meeting, Oct. 3, 1949 and the water content graph by McKetta at page 15-10 of the GPSA Engineering Data Book.

Signal 103, which is representative of the pounds of water contained in each million standard cubic feet of wet natural gas, is provided from the calculate water content block 101 as a first input to the multiplying block 104.

Flow transducer 61 in combination with a flow sensor 62, which is operably located in conduit means 11, provides an output signal 64 which is representative of the actual flow rate of the wet natural gas through conduit means 11. Signal 64 is supplied as an input to computer 100 and is specifically supplied as a second input to the multiplying block 104. Signal 103 is multiplied by signal 64 to establish signal 107 which is representative of the flow rate of water to the dehydrating tower which is in a drying cycle. Signal 107 is supplied from the multiplying block 104 as an input to the integrating block 108.

The integrating block 108 is essentially utilized to integrate signal 107 as a function of time. Integrating block 108 is reset each time the dehydrating towers are switched and thus the integrating block 108 provides an output signal 109 which is representative of the amount of water which has entered a dehydrating tower since the beginning of a drying cycle. Signal 109 is provided from the integrating block 108 as a first input to the comparator 111.

As has been previously stated, integrating block 108 is reset each time the dehydrating towers are switched. The value of signal 109 when this switch occurs is stored in memory. Preferably, the twenty most recent cycles are averaged in the calculate bed capacity block 114 to obtain signal 115 which is representative of a calculated average desicant bed capacity. Signal 115 is supplied from the calculate bed capacity block 114 as a first input to the multiplying block 116.

Multiplying block 116 is also supplied with signal 117 which is representative of a factor by which the actual calculated water content represented by signal 109 can exceed the average desicant bed capacity represented by signal 115 before the control based on signal 31 will be allowed to override the control based on signal 28. Preferably, a value of 1.05 is utilized for signal 117. Signal 115 is multiplied by signal 117 to establish signal 118 which is supplied from the multiplying block 116 as a second input to the comparator 111.

The output signal 121 from the comparator 111 will change states only when the magnitude of signal 109 equals or exceeds the magnitude of signal 118. Signal 121 is supplied as signal 31 from computer 100 and is also supplied as a second input to the OR gate 124.

As with signal 28, signal 31 may also be considered a digital signal. Signal 31 will have a low logic level until such time as the magnitude of signal 109 equals or exceeds the magnitude of signal 118 at which time signal 31 will assume a high logic level.

A reset signal is supplied from the output of the OR gate 124 to the integrator 108. This reset signal is activated when the dehydrating towers are switched because of action based on signal 28 or action based on signal 31.

Many different circuits could be utilized for the valve control 27. One simplified circuit is illustrated in FIG. 2.

Referring now to FIG. 2, signal 28 from the moisture analyzer and signal 31 from computer 100 are provided as inputs to the OR gate 201. The output from the OR gate 201 is supplied to the D input of the toggle flip-flop 202. The Q output from the toggle flip-flop 202 is supplied as the switching control input to the switch 203. Pole 204 of the switch 203 is tied to power. Pole 205 supplies signals 37 and 39 which have been previously described. In like manner pole 206 supplies signals 36 and 38 which have been previously described.

In operation, a change to a high logic level by either signal 28 or signal 31 will cause the toggle flip-flop to change states. This change in state will cause the switch 203 to change positions which will have the desired effect of changing the position of valves 41-44.

In summary, control based on the output of the moisture analyzer 29 provides switching between the dehydrating towers 14 and 16 based on moisture breakthrough which is the ideal situation. However, if the moisture analyzer should fail, control based on the calculation of the water provided to a dehydrating tower during a drying cycle is utilized to override the control based on the output from the moisture analyzer. Such override control significantly improves the reliability of the dehydrating tower switching system.

The invention has been described in terms of a preferred embodiment as illustrated in FIGS. 1 and 2. Specific components which can be used in the practice of the invention as illustrated in FIG. 1 such as flow sensor 62, flow transducer 61, pressure transducer 51, temperature transducer 54 and control valves 41-44 are each well known, commercially available control components such as are described at length in *Perry's Chemical Handbook*, 4th Edition, Chapter 22, McGraw-Hill. Also, the electrical components illustrated in FIG. 2 are well known and available from a number of suppliers.

While the invention has been described in terms of the presently preferred embodiment, reasonable variations and modifications are possible by those skilled in the art and such modifications and variations are within the scope of the described invention and the appended claims.

That which is claimed is:

1. Apparatus comprising:
   a first dehydrating tower;
   a second dehydrating tower;
   means for providing a wet gas through a first valve to said first dehydrating tower and through a second valve to said second dehydrating tower, wherein said first valve is open to allow said wet gas to flow through said first dehydrating tower to dry said wet gas and wherein said second valve is closed to prevent said wet gas from flowing through said second dehydrating tower while said wet gas is flowing through said first dehydrating tower;
   means for withdrawing dry gas from said first dehydrating tower and said second dehydrating tower;
   means for establishing a first signal representative of the presence of an unacceptable water content at the fluid outlet of said first dehydrating tower, wherein the presence of an unacceptable level of water indicates that the capacity of said first dehydrating tower has been exceeded;
   means for closing said first valve and opening said second valve in response to said first signal when said first signal indicates that an unacceptable concentration of water is present in the gas withdrawn from said first dehydrating tower;

means for establishing a second signal representative of the total amount of water which has been removed by said first dehydrating tower since the time said first valve was opened to allow wet gas to flow to said first dehydrating tower;

means for establishing a third signal representative of the maximum desired amount of water which can be provided to said first dehydrating tower;

means for comparing said second signal and said third signal and for establishing a fourth signal which indicates when said second signal equals or exceeds said third signal; and means for closing said first valve and opening said second valve when said fourth signal indicates that said second signal has exceeded said third signal, wherein said second signal will exceed said third signal only if the closing of said first valve and opening of said second valve in response to said first signal does not occur when an unacceptable concentration of water is present in the gas flowing from said first dehydrating tower.

2. Apparatus in accordance with claim 1 wherein said means for establishing said first signal comprises a moisture analyzer in fluid communication with the gas which has been treated in said first dehydrating tower.

3. Apparatus in accordance with claim 2 wherein said means for establishing said second signal comprises:

means for establishing a fifth signal representative of the actual pressure of said wet gas flowing to said first dehydrating tower;

means for establishing a sixth signal representative of the actual temperature of the wet gas flowing to said first dehydrating tower;

means for establishing a seventh signal representative of the amount of water contained in a unit volume of said wet gas in response to said fifth signal and said sixth signal;

means for establishing an eighth signal representative of the actual flow rate of said wet gas flowing to said first dehydrating tower;

means for multiplying said seventh signal and said eighth signal to establish a ninth signal representative of the amount of water being supplied to said first dehydrating tower in said wet gas per unit time; and means for integrating said ninth signal with respect to time beginning at the time said first valve is opened to allow wet gas to flow to said first dehydrating tower to establish said second signal.

4. Apparatus in accordance with claim 3 wherein said means for establishing said third signal comprises:

means for establishing a tenth signal representative of the theoretical water capacity of said first dehydrating tower;

means for establishing an eleventh signal representative of the percentage by which the actual water supplied to said first dehydrating tower can exceed the value of said tenth signal; and means for multiplying said tenth signal by said eleventh signal to establish said third signal.

5. Apparatus in accordance with claim 4 additionally comprising means for resetting said means for integrating said ninth signal when said first control valve is closed and said second control valve is opened.

6. A method for controlling the switching of the flow of a wet gas between first and second dehydrating towers, wherein said wet gas is provided through a first valve to said first dehydrating tower and through a second valve to said second dehydrating tower, wherein said first valve is open to allow said wet gas to flow through said first dehydrating tower to dry said wet gas and wherein said second valve is closed to prevent said wet gas from flowing through said second dehydrating tower while said wet gas is flowing through said first dehydrating tower, said method comprising the steps of:

establishing a first signal representative of the presence of an unacceptable water content at the fluid outlet of said first dehydrating tower, wherein the presence of an unacceptable level of water indicates that the capacity of said first dehydrating tower has been exceeded;

closing said first valve and opening said second valve in response to said first signal when said first signal indicates that an unacceptable concentration of water is present in the gas withdrawn from said first dehydrating tower;

establishing a second signal representative of the total amount of water which has been removed by said first dehydrating tower since the time said first valve was opened to allow wet gas to flow to said first dehydrating tower;

establishing a third signal representative of the maximum desired amount of water which can be provided to said first dehydrating tower;

comparing said second signal and said third signal and establishing a fourth signal which indicates when said second signal equals or exceeds said third signal; and closing said first valve and opening said second valve when said fourth signal indicates that said second signal has exceeded said third signal, wherein said second signal will exceed said third signal only if the closing of said first valve and opening of said second valve in response to said first signal does not occur when an unacceptable concentration of water is present in the gas flowing from said first dehydrating tower.

7. A method in accordance with claim 6 wherein said step of establishing said first signal comprises using a moisture analyzer in fluid communication with the gas which has been treated in said first dehydrating tower to establish said first signal.

8. A method in accordance with claim 7 wherein said step of establishing said second signal comprises:

establishing a fifth signal representative of the actual pressure of said wet gas flowing to said first dehydrating tower;

establishing a sixth signal representative of the actual temperature of the wet gas flowing to said first dehydrating tower;

establishing a seventh signal representative of the amount of water contained in a unit volume of said wet gas in response to said fifth signal and said sixth signal;

establishing an eighth signal representative of the actual flow rate of said wet gas flowing to said first dehydrating tower;

multiplying said seventh signal and said eighth signal to establish a ninth signal representative of the amount of water being supplied to said first dehydrating tower in said wet gas per unit time; and integrating said ninth signal with respect to time beginning at the time said first valve is opened to allow wet gas to flow to said first dehydrating tower to establish said second signal.

9. A method in accordance with claim 8 wherein said step of establishing said third signal comprises:
   establishing a tenth signal representative of the theoretical water capacity of said first dehydrating tower;
   establishing an eleventh signal representative of the percentage by which the actual water supplied to said first dehydrating tower can exceed the value of said tenth signal; and
   multiplying said tenth signal by said eleventh signal to establish said third signal.

10. A method in accordance with claim 9 additionally comprising the step of resetting the integration of said ninth signal to zero when said first control valve is closed and said second control valve is opened.

* * * * *